(No Model.)
R. B. KILLIN.
FODDER CUTTER.
No. 427,769. Patented May 13, 1890.
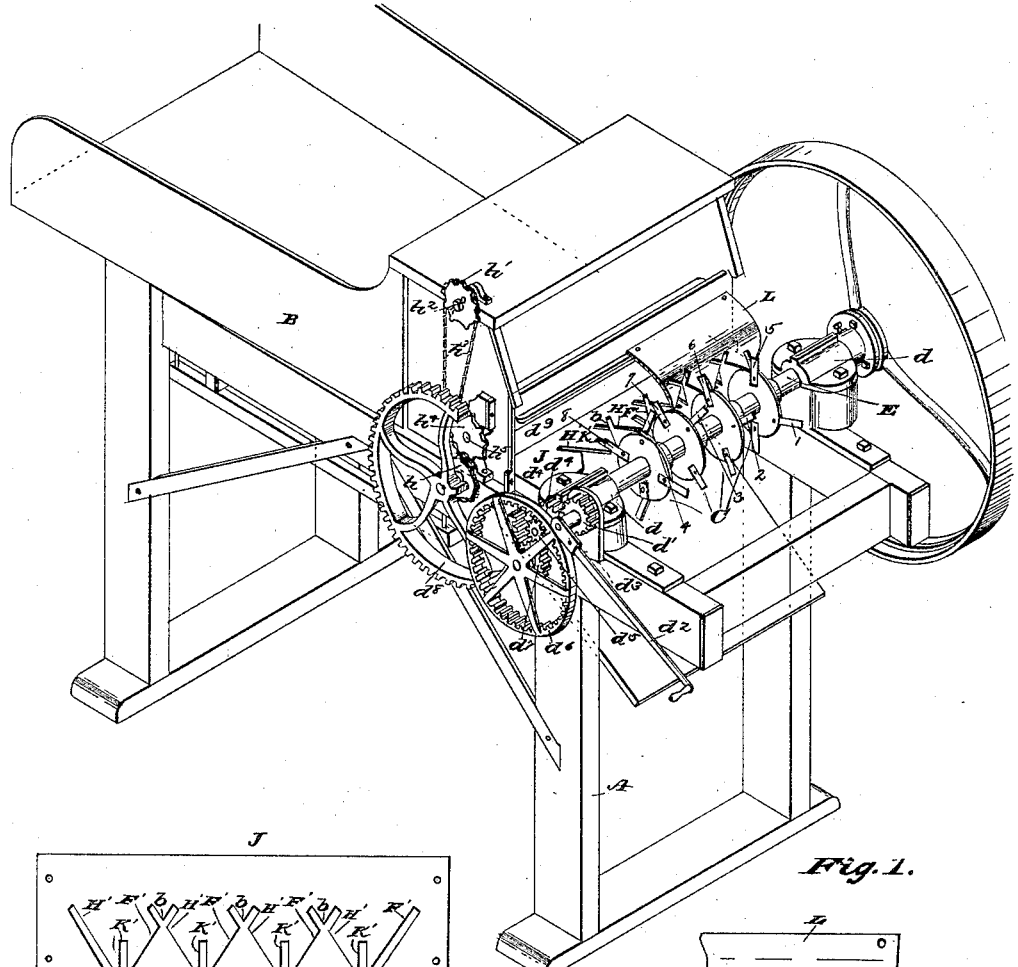
Fig. 1.
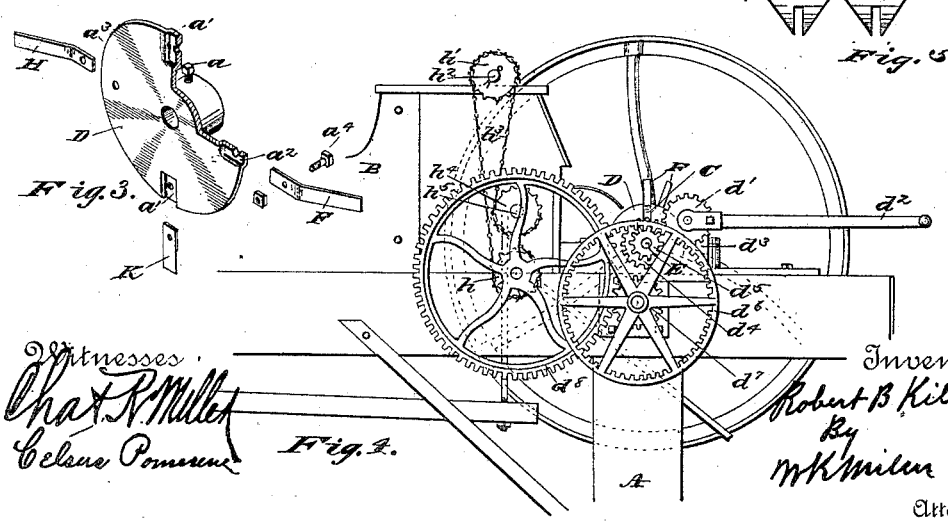
Witnesses
Chas. R. Miller
Celsus Pomerene
Inventor
Robert B. Killin
By W. K. Miller
Attorney

UNITED STATES PATENT OFFICE.

ROBERT B. KILLIN, OF CANTON, OHIO, ASSIGNOR OF ONE-HALF TO ANDREW WOLF, OF SAME PLACE.

FODDER-CUTTER.

SPECIFICATION forming part of Letters Patent No. 427,769, dated May 13, 1890.

Application filed May 3, 1889. Serial No. 309,516. (No model.)

*To all whom it may concern:*

Be it known that I, ROBERT B. KILLIN, a citizen of the United States, and a resident of Canton, county of Stark, State of Ohio, have invented a new and useful Improvement in Fodder-Cutters, of which the following is a full, clear, and exact description, reference being had to the accompanying drawings, making part of this specification.

My invention relates to improvements in fodder-cutters, and has for its object to provide a cutter-head with a series of knives set diagonally right and left of a line drawn through the cutter-head shaft, and a series of splitting-knives between the reversely-set diagonal knives, and to provide a fodder-cutter that shall be simple in construction, durable in use, and comparatively inexpensive of production.

With these ends in view the invention consists in certain features of construction and combination of parts, as will be hereinafter described, and pointed out in the claims.

In the accompanying drawings, Figure 1 is a view in perspective of a fodder-cutter, illustrating my invention. Fig. 2 is a plan view of the cutter-bar. Fig. 3 is a perspective view of parts hereinafter described. Fig. 4 is a side elevation of the front portion of the machine, and Fig. 5 is a plan view of a portion of the compressor.

In the accompanying drawings, wherein like letters of reference denote corresponding parts in the several views, A denotes the frame and B the box, which may be of the usual or improved construction, and will only be referred to in conjunction with my invention.

Journaled in boxes $d$, secured to beams of the frame A, is a shaft E, upon which the cutter-head is mounted. The cutter-head consists of a series of disks D, secured to the said shaft by set-screws $a$. The periphery of each of said disks is provided with a series of recesses $a'$ $a^2$ $a^3$, the recesses $a'$ $a^2$ on the face side of the disk and the recess $a^3$ on the reverse side. The splitting and cutting knives, hereinafter described, are secured in these recesses by bolts $a^4$. The knife F, secured in recess $a^2$, is bent to the right of a line diagonal to the shaft E, and the knife H, secured in recess $a^3$, is bent to the left of a line at right angles to the axis of the shaft E. The diagonally-diverging knives are diametrically opposite each other on the disk D, and between the said knives and diametrically opposite each other in the recesses $a'$ are secured straight splitting-knives K. The cutter-bar J is secured to the front portion of the frame A, as shown in Fig. 1. The said bar is of the form shown in Fig. 2, and is provided with a series of diagonally-diverging cutting-edges F' H and transverse cutting-edges K', the line of the rear portion of the cutting-edges F' and H' crossing each other, as shown at $b$, thereby providing extending cutting-surfaces. It will be noticed that the knives F are arranged spirally about the shaft E, as shown by numerals 1, 2, 3, and 4 in Fig. 1, compassing about one-fourth of the diameter of the circle described by said knives, the knives H forming a similar spiral diametrically opposite those indicated by the numerals 1, 2, 3, and 4, by which arrangement the straight knives $k$ will be arranged spirally about the said shaft diametrically opposite in the spaces between the knives F and H, as shown by numerals 5, 6, 7, and 8 in Fig. 1. By this arrangement it will be observed that when the shaft E is rotated the knives F, K, and H will engage with the cutting-edges F', K', and H, respectively, of the cutting-bar J.

To prevent the fodder raising while being cut by the knives, a compressor L is provided, a fragment of which is shown in Figs. 1 and 5. The front edge of this compressor is cut in substantially the shape as the front edge of the cutter-bar J, so as to allow the revolving cutters to pass through.

That the operator may face the working of the machine, a pinion $d'$ and a crank $d^2$ are mounted on a short shaft projecting from a plate $d^3$, the said pinion engaging pinion $d^4$ on the end portion of the shaft E, and to provide a proper movement for the feed-rollers, which may be of any of the well-known forms, a small pinion $d^5$ is mounted on the end of the shaft E, the said pinion to engage the edges of the internal gear-wheel $d^6$, and a pinion $d^7$, integral with the wheel $d^6$, engages the wheel $d^8$ on the shaft of the lower roller $d^9$. On said roller-shaft is also mounted a sprocket-wheel $h$, and at the top portion of the box B is provided a sprocket-wheel $h'$, supported upon a pin $h^2$. A sprocket-chain $h^3$ is placed about the sprocket-wheels $h\ h'$ and engages with its outer face the sprocket-wheel $h^4$, secured to the shaft $h^5$ of the upper feed-roller, which is journaled in the usual manner in slots in the box B. By this arrangement of gearing it will be noticed that the feed-rolls will be operated in different directions, and that the upper feed-roll will be allowed to raise or fall as the amount of fodder between the rolls may be varied, and yet maintain a constant driving engagement with the chain whereby the fodder is fed to the cutters.

From the foregoing description, taken in connection with the accompanying drawings, the operation of my invention will be readily understood.

It will be seen that I overcome a great drawback in machines of this class that employ diagonal knives and diagonally-toothed cutting-bars, the tendency of the knives in such machines being constantly to force the fodder to one side and away from the cutters; but by providing a set of rotary and stationary cutters diverging diagonally or in the opposite direction, so that in operation the fodder that has been forced to one side by knife F will be cut or forced back by knife H and will be split by knife K between the diagonal knives, the drawback is overcome.

Having thus described my invention, I claim—

1. In a fodder-cutter, the combination, with the cutter-bar having diagonally-diverging cutting-edges crossing each other, as at $b$, of the outwardly-extending and oppositely-diverging knives, substantially as set forth.

2. The combination, with the rotary shaft and the disks having reversely-set diagonally-diverging knives and straight splitting-knives, of the cutter-bar having corresponding stationary cutting-edges, substantially as set forth.

3. In a fodder-cutter, the combination, with outwardly-extending and oppositely-diverging rotary knives and a straight splitting-knife, of a cutter-bar having cutting-edges to meet said knives, substantially as set forth.

4. In a fodder-cutter, the combination, with outwardly-extending and oppositely-diverging rotary knives, of a cutter-bar having cutting-edges to meet said knives, and a compressor, substantially as set forth.

In testimony whereof I have hereunto set my hand this 29th day of April, A. D. 1889.

ROBERT B. KILLIN.

Witnesses:
W. K. MILLER,
CHAS. R. MILLER.